(12) United States Patent
Lanzone et al.

(10) Patent No.: US 9,264,168 B2
(45) Date of Patent: Feb. 16, 2016

(54) COMMUNICATIONS NETWORK USING ADAPTABLE FEC

(75) Inventors: Sergio Lanzone, Genoa (IT); Ghani Abdul Muttalib Abbas, Nottingham (GB); Orazio Toscano, Genoa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 240 days.

(21) Appl. No.: 13/996,444

(22) PCT Filed: Mar. 15, 2011

(86) PCT No.: PCT/EP2011/053847
§ 371 (c)(1),
(2), (4) Date: Sep. 16, 2013

(87) PCT Pub. No.: WO2012/084270
PCT Pub. Date: Jun. 28, 2012

(65) Prior Publication Data
US 2013/0343750 A1    Dec. 26, 2013

(30) Foreign Application Priority Data
Dec. 23, 2010    (EP) .................................. 10196749

(51) Int. Cl.
*H03M 13/00* (2006.01)
*H04J 14/02* (2006.01)
(Continued)

(52) U.S. Cl.
CPC ......... *H04J 14/0221* (2013.01); *H04J 14/0212* (2013.01); *H04J 14/0273* (2013.01);
(Continued)

(58) Field of Classification Search
CPC .......... H03M 13/116; H03M 13/6527; H03M 13/27; H03M 13/353; H03M 13/373; H03M 13/09; H03M 13/1102; H03M 13/1515; H03M 13/35; H04L 1/0057; H04L 1/0025; H04L 1/0021; H04L 1/0009; H04L 1/0002; H04L 1/0026; H04L 1/0017; H04L 1/203; H04Q 11/0062; H04Q 2011/008; H04J 14/0221; H04J 14/0273; H04J 14/0212; H04J 2203/006; H04J 2203/0089
See application file for complete search history.

(56) References Cited

U.S. PATENT DOCUMENTS 5,699,365 A * 12/1997 Klayman et al. .............. 714/708
6,683,855 B1 * 1/2004 Bordogna et al. ............ 370/244
(Continued)

FOREIGN PATENT DOCUMENTS

EP    1981202 A2    10/2008
WO    WO-2009134220 A1    11/2009

OTHER PUBLICATIONS

International Telecommunication Union, Series G: Transmission Systems and Media, Digital Systems and Networks, 2010; Geneva, Switzerland; pp. 1-218.
International Search Report, Application No. PCT/EP2011/053847, dated Oct. 21, 2011, 3 pages.
(Continued)

*Primary Examiner* — Guerrier Merant
(74) *Attorney, Agent, or Firm* — Nicholson De Vos Webster & Elliott, LLP

(57) ABSTRACT

A node for a communications network has a converter for digitizing at a receiver clock rate a received optical signal received over an optical link from an optical transmitter at a source node, a framer for detecting frames and a forward error correction part for correcting errors in the payload of the frame. An error rate in the received payload part is monitored and a processor sends, according to the monitored error rate, a request to the optical transmitter to adapt a length of the transmitted forward error correction part and to adapt a clock rate of the transmission of the frame if FEC length is reduced or FEC is disabled. This can enable power saving, when less FEC information is being sent.

19 Claims, 11 Drawing Sheets

(51) Int. Cl.
*H04L 1/00* (2006.01)
*H04L 1/20* (2006.01)

(52) U.S. Cl.
CPC .............. *H04L1/0009* (2013.01); *H04L 1/203* (2013.01); *H04J 2203/006* (2013.01); *H04J 2203/0089* (2013.01); *H04L 1/0026* (2013.01)

(56) References Cited

U.S. PATENT DOCUMENTS

| | | | | |
|---|---|---|---|---|
| 6,802,033 | B1* | 10/2004 | Bertin et al. | 714/704 |
| 2005/0066250 | A1* | 3/2005 | Coleman et al. | 714/752 |
| 2006/0080581 | A1* | 4/2006 | Ono | 714/704 |
| 2006/0184860 | A1* | 8/2006 | Takagi | 714/774 |
| 2007/0280681 | A1* | 12/2007 | Frankel et al. | 398/5 |
| 2008/0037666 | A1 | 2/2008 | Tzannes | |
| 2008/0219334 | A1* | 9/2008 | Brainos et al. | 375/221 |
| 2009/0304380 | A1* | 12/2009 | Sadananda et al. | 398/26 |
| 2010/0021158 | A1* | 1/2010 | Kanno et al. | 398/27 |
| 2011/0066915 | A1* | 3/2011 | Arye | 714/752 |

OTHER PUBLICATIONS

PCT Written Opinion of the International Searching Authority, Counterpart PCT Application No. PCT/EP2011/053847, dated Jun. 23, 2013, 5 pages.

PCT International Preliminary Report on Patentability (Chapter I), Counterpart PCT Application No. PCT/EP2011/053847, dated Jun. 25, 2013, 6 pages.

ITU-T G.709/Y.1331: Interfaces for the Optical Transport Network (OTN); International Telecommunication Union (ITU); Telecommunication Standardization Sector; Series G: Transmission Systems and Media Digital Systems and Networks; Digital Terminal Equipments—General; Series Y: Global Information Infrastructure, Internet Protocol Aspects and Next-Generation Networks, Internet protocol aspects—Transport; Dec. 2009; 218 pages.

ITU-T G.798: Characteristics of Optical Transport Network hierarchy equipment functional blocks, International Telecommunication Union (ITU); Series G: Transmission Systems and Media Digital Systems and Networks; Digital terminal equipments—Other terminal equipment; Dec. 2010; 356 pages.

* cited by examiner

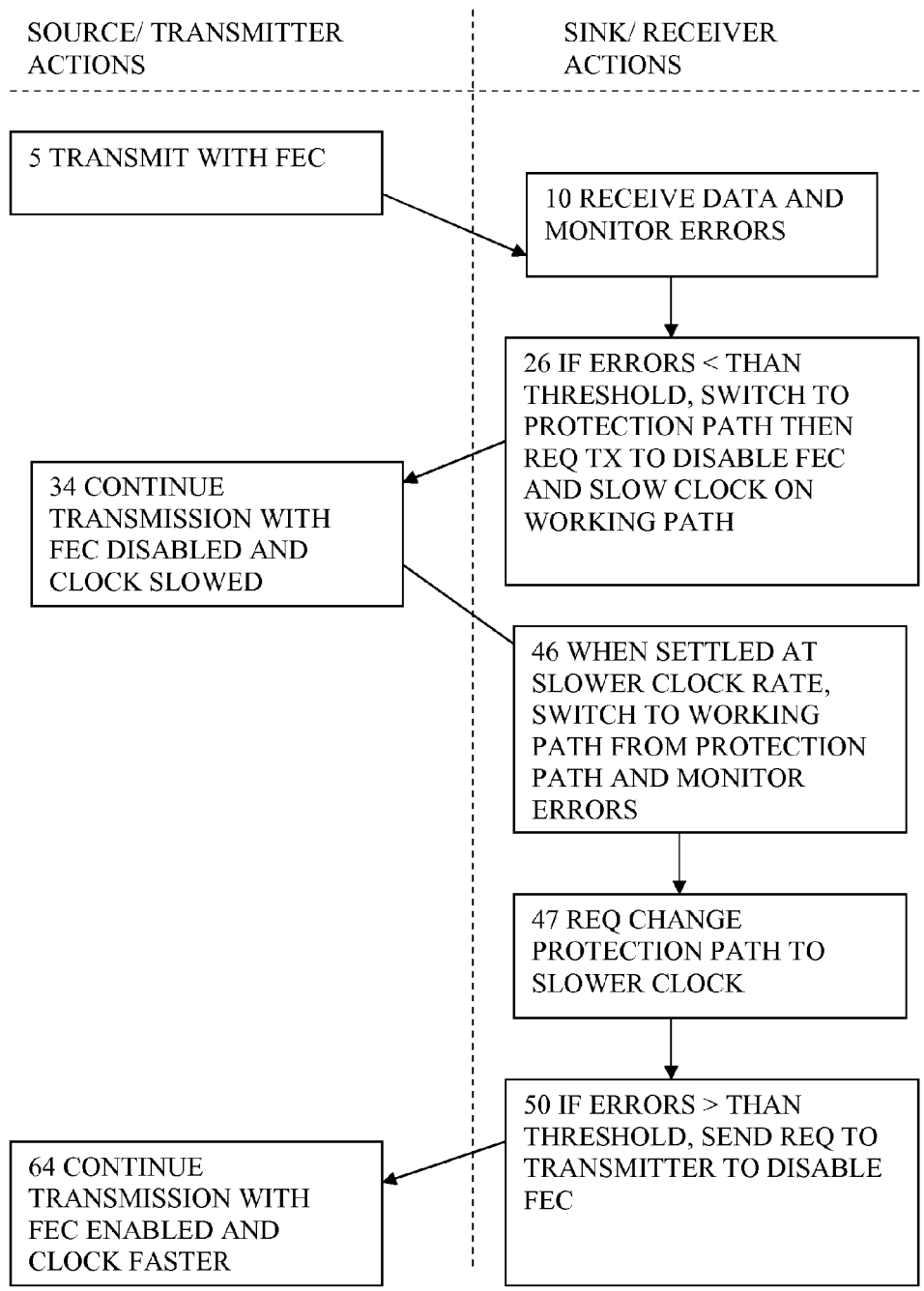

COMMUNICATIONS NETWORK USING ADAPTABLE FEC

CROSS-REFERENCE TO RELATED APPLICATIONS

This application is a National stage of International Application No. PCT/EP2011/053847, filed Mar. 15, 2011, which claims priority to EP Application No. 10196749.5, filed Dec. 23, 2010, which are hereby incorporated by reference.

TECHNICAL FIELD

This invention relates to nodes for communications networks, operable as source nodes or as sink nodes, to methods of using such nodes, and to corresponding computer programs for controlling such nodes, and in particular embodiments to optical transport networks of the type described in the G.709 and related standards.

BACKGROUND

Communications networks such as optical networks often employ error correction. Such optical networks typically use wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. In WDM, DWDM and other optical networks, arrayed waveguide gratings (AWGs), interleavers, and/or fibergratings (FGs) can be used to add and drop traffic at network nodes and to multiplex and demultiplex traffic at network nodes. To enable reconfiguring the wavelength paths to be dropped or added at different nodes, network nodes having optical switches can be provided, known as all optical ROADM (Reconfigurable Optical Add Drop Multiplexer) nodes.

It has been appreciated that DWDM does not provide its own overhead for management nor protection schemes to recover from equipment failures. DWDM involves more network elements than earlier point to point optical links. Such elements, such as-optical amplifiers, multiplexers, and demultiplexers—and dispersion compensation units, can bring reliability concerns and warrant monitoring. As a result, the G.709 Optical Transport Network, or OTN standard was generated by the International Telecommunication Union Telecommunication Standardization (ITU-T) to provide management functionality for DWDM optical networks. OTN involves adding a frame of overhead information, (also called a digital wrapper), some to the front of the signal as a header, and some such as FEC (Forward Error Correction) as a trailer appended to the rear. The FEC can extend optical span distances by reducing bit error rates (BERs).

FEC is one of the most attractive features provided by G.709 Hierarchy. It allows the receiver to detect and correct errors and therefore permits the transmission of data along "disturbed" paths or to reach a longer distance than an equivalent signal without this feature. Therefore the FEC can improve the quality of the transmission but its deployment has a cost.

SUMMARY

An object of the invention is to provide improved apparatus or methods. According to a first aspect, the invention provides:

A node for a communications network, the node being operable as a sink node and having a converter for digitizing at a receiver clock rate a received optical signal received over an optical link from an optical transmitter at another node, a framer for detecting frames in the digital data, the frames each having a payload part, and a forward error correction part. The node also has an error corrector for correcting errors in the payload part using the forward error correction part of the frame, a monitor for monitoring an error rate in the received payload part, and a processor. The processor is arranged to send, according to the monitored error rate, a request to the optical transmitter to adapt a length of the transmitted forward error correction part and to adapt a clock rate of the transmission of the frame. This means a reduced clock rate is possible when FEC is reduced or disabled, which can enable power saving at the transmitter (source) or at both the transmitter and the receiver (sink), when less FEC is needed. According to another aspect there is provided a node for a communications network, the node being operable as a source node and having an optical transmitter for transmitting an optical signal over an optical link to another node, and a framer for outputting frames having a payload part and an error correction part at a first clock rate. The node also has a converter for converting the frames into the optical signal for transmission, and a processor arranged to receive a request to adapt the size of the transmitted forward error correction part and in response to adapt a length of the error correction part in the frames, and adapt a clock rate of the framer.

Another aspect of the invention provides a method of transmitting a payload of data from a first node of a communications network, and acting as a source node, to a second node acting as a sink node, the method having the steps of transmitting frames of data from the source node, the frames each having a payload part, and a forward error correction part, and receiving at the source node a request from the sink node. The request is to adapt a length of the transmitted forward error correction part according to a monitored error rate and to adapt a clock rate of the transmission of the frame, according to the adapted length of the forward correction part. At the source node, the length of the forward error correction part in each frame is then adapted.

Another aspect of the invention provides a method of receiving a payload of data sent from a first node of a communications network acting as a source node, to a second node acting as a sink node, the method having the steps of, receiving at the sink node frames of data from the source node, the frames each having a payload part, and a forward error correction part, correcting errors in the payload part using the forward error correction part of the frame, and monitoring an error rate in the received payload part. A request is sent to the source to adapt a length of the transmitted forward error correction part according to the monitored error rate and to adapt a clock rate of the transmission of the frame, according to the adapted amount of the forward correction part. At the sink node, the data is received at the adapted clock rate of the transmitter and with an adapted length of the forward error correction part in each frame.

Another aspect of the invention provides a method of transmitting a payload of data from a first node of a communications network acting as a source node to a second node acting as a sink node, the method having the steps of transmitting frames of data from the source node, the frames each having a payload part, and a forward error correction part, at the sink node, receiving the data, correcting errors in the payload part using the forward error correction part of the frame, and monitoring an error rate in the received payload part. The method also involves sending a request to the source to adapt a length of the transmitted forward error correction part according to the monitored error rate and to adapt a clock rate of the transmission of the frame, according to the adapted amount of the forward correction part, at the source node, adapting the length of the forward error correction part in each frame, and at the sink node, continuing to receive the frames of data having the adapted length of the forward error correction part in each frame.

Another aspect of the invention provides a computer readable storage medium having a stored program for execution by a processor for controlling a node for a communications network, the node acting as a sink node and having a converter for digitizing at a receiver clock rate a received optical signal received over an optical link from an optical transmitter at another node, a framer for detecting frames in the digital data, the frames each having a payload part, and a forward error correction part, the node also having an error corrector for correcting errors in the payload part using the forward error correction part of the frame, and a monitor for monitoring an error rate in the received payload part. The program has instructions which when executed by the processor cause the processor to carry out the steps of receiving a monitored error rate from the monitor, sending, according to the monitored error rate, a request to the transmitter to adapt a length of the transmitted forward error correction part and to adapt a clock rate of the transmission of the frame.

Another aspect provides a computer readable storage medium having a stored program for execution by a processor for controlling a node for a communications network, the node acting as a source node and having an optical transmitter for transmitting an optical signal over an optical link to another node, the node also having a framer for outputting frames having a payload part and an error correction part at a first clock rate, a converter for converting the frames into the optical signal for transmission, and a processor arranged to receive a request to adapt the size of the transmitted forward error correction part and in response to adapt a length of the error correction part in the frames, and adapt a clock rate of the framer. The program has instructions which when executed by the processor cause the processor to carry out the steps of causing the optical transmitter to transmit frames of data, the frames each having a payload part, and a forward error correction part, receiving a request from the sink node to adapt a length of the transmitted forward error correction part according to a monitored error rate and causing the optical transmitter to adapt a clock rate of the transmission of the frame, according to the adapted length the forward correction part, and at the source node, adapting the length of the forward error correction part in each frame.

Any additional features can be added to these aspects, or disclaimed from them, and some are described in more detail below. Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIGS. 10 and 11 show a network view and a time chart for an embodiment using protection switching during clock adaptation

DETAILED DESCRIPTION

Figure 1:
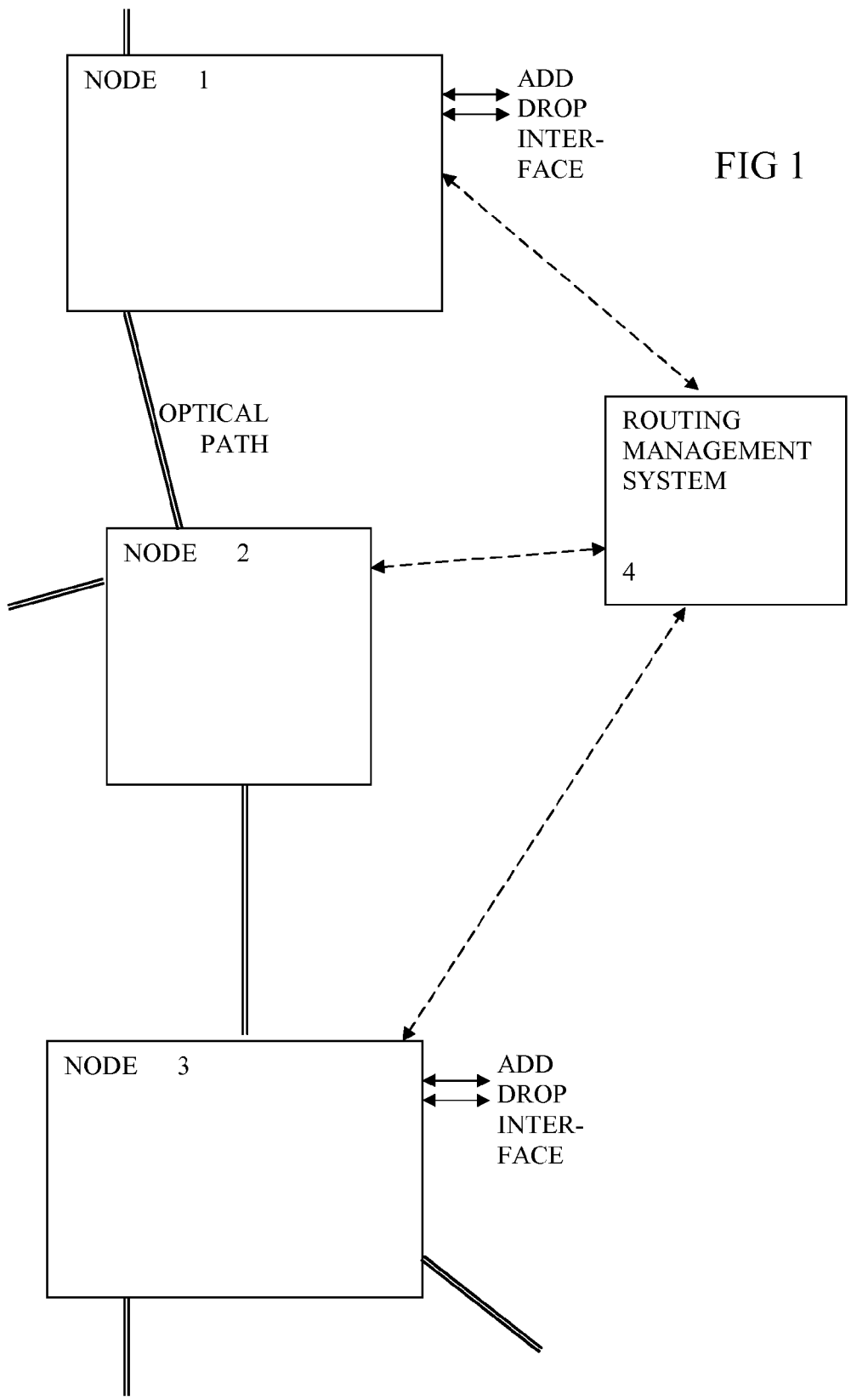
FIGS. 1 and 2 show a network view and node example respectively.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

DEFINITIONS

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to software can encompass any type of programs in any language executable directly or indirectly on processing hardware.

References processors or circuitry can encompass any kind of logic or analog circuitry, integrated to any degree, and not limited to general purpose processors, digital signal processors, ASICs, FPGAs, discrete components or logic and so on.

References to a storage medium are intended to encompass storage in non transitory form not including a signal passing along a communications path.

ABBREVIATIONS

FEC Forward Error Correction
OCH Optical Channel
ODUk Optical Data Unit
OTN Optical Transport Network
OTUk Optical Transport Unit

REFERENCES

ITU-T G.709: Interfaces for the Optical Transport Network (OTN), version currently in force is G.709/Y.1331 (12/09).
ITU-T G.798: Characteristics of Optical Transport Network hierarchy equipment functional blocks, version currently in force is G.798 (10/10).

INTRODUCTION

By way of introduction to the embodiments, some issues with conventional designs will be explained. Telecommunication network operators are beginning to pay more attention to the power efficiency of their networks. As yet, telecommunications transmission products have not effectively addressed this requirement. Until now, in the telecom vendors' community, the focus has been to reduce space occupation, enhancing the traffic handling capability per bay, but this caused the power consumption to increase. Even as new technologies have been introduced, such power consumption has not improved. Embodiments of the present invention can reduce the power consumption in data transport equipment, by adapting the FEC. This is particularly applicable in equipment based on G.709/G.798 OTN technology.

Looking specifically at G.709 hierarchy, FEC has a cost in term of bandwidth occupation. In fact in the OTUk frame (i.e. the frame used for the transport of data trough the physical links) 7% of the bandwidth is used to transport the FEC code in a standard solution. In a proprietary solution using FEC, this occupation can be even more (e.g. 20%). This means that, on a link using FEC, the clock of the transmitter would be increased by 7-20%, depending on the type of FEC used, compared to the same link using the same quantity of information but without FEC. Considering that the power consumption of digital processing tends to increase with the square of the clock speed, even a modest change in clock speed could make a notable difference to power consumption. This means that the transmission of the same quantity of data using FEC requires more power than a transmission without FEC.

Furthermore the FEC processing consumes a lot of resources also in computation capability (e.g. number of gates required in the ASSP/ASIC/FPGA implementing the G.709 processing) and therefore in power consumption.

According to ITU-T G.798 standard, the FEC encoding is always enabled (See Sect.12.3.1.1: OCh/OTUk-a_A_So function), though the operator can decide to enable/disable the FEC decoding via a specific command (See Sect.12.3.1.3: OCh/OTUk-a_A_Sk function). The bit rate of the OTUk is the same in both cases; the only difference is that when the FEC is enabled the FEC part of the frame is transporting the FEC code, while when FEC is disabled the FEC part is transporting only stuff bytes.

This means that even when the link does not need FEC because its quality is good, the signal is anyway transmitted at 7-20% faster clock rate for no purpose. Currently in practice, the operator chooses to have FEC always enabled even when the quality of the link could permit error free transmission without FEC. This has a corresponding impact on the power consumption of their network.

Introduction to Features of Embodiments

The embodiments described below propose a solution to adapt the FEC, such as by disabling the FEC encoding/decoding, or reducing the proportion of the frame devoted to FEC, and therefore increasing/decreasing the transmission speed, automatically according to whether the FEC is needed, therefore, improving the power consumption in an Optical Transport Network. It is known to provide adaptive FEC for optical systems based on for example a bit error rate, but not to adjust the transmission clock to save power when less FEC information is being sent.

The embodiments described provide nodes and a protocol of information exchange between the Sink and the Source nodes. In the case of the frames being OTUk frames, then the sink and source nodes are the endpoints of the OTUk link. Based on the quality of the received signal detected at the Sink, the Sink can request the Source to enable/disable the FEC encoding and accordingly to increase/decrease the clock of the transmission.

Figure 2:
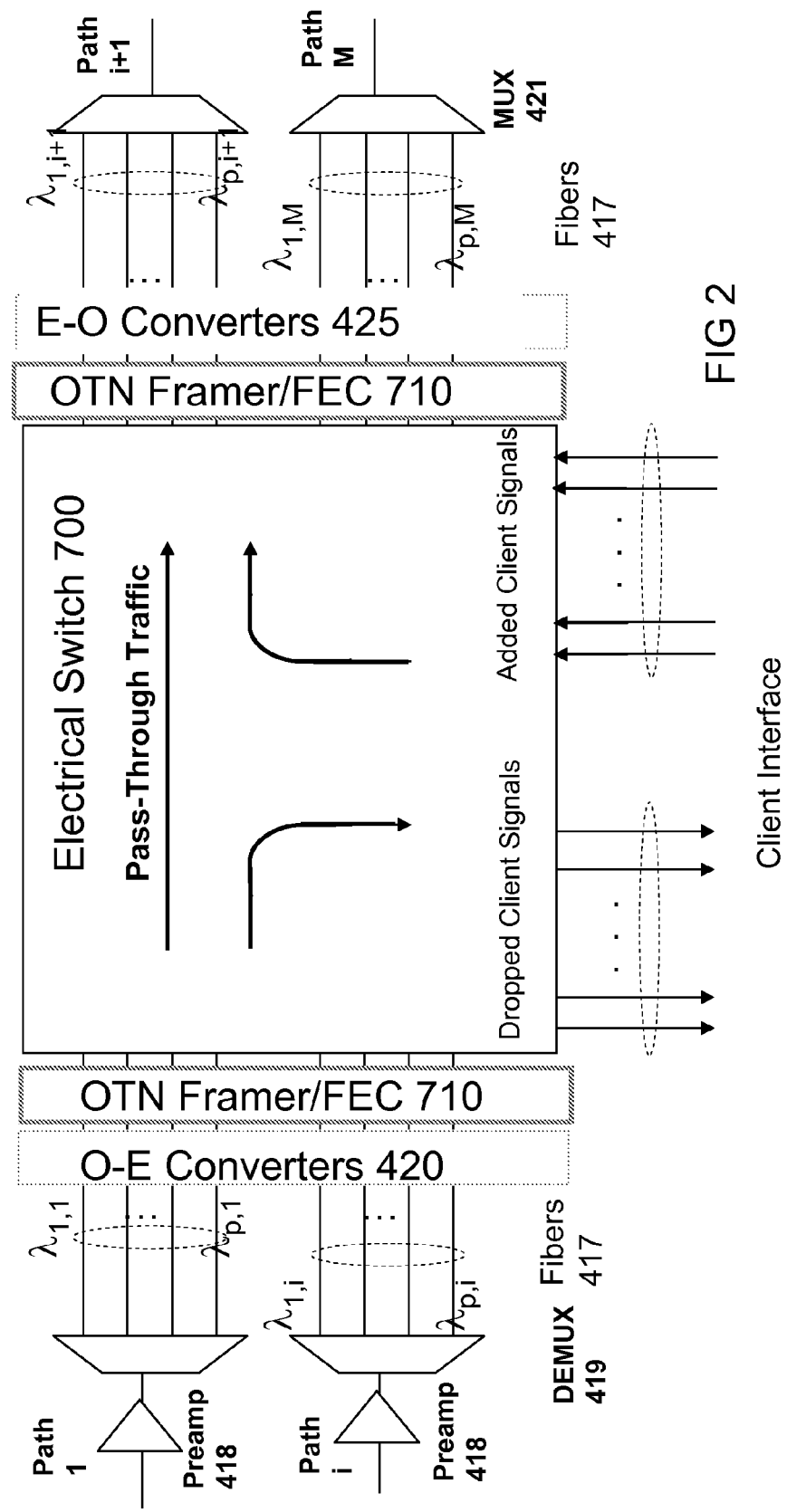

FIGS. 1, 2, Network View and Node Example

FIG. 1 shows a schematic view of a number of switching nodes in part of an optical network according to an embodiment. Three switching nodes 1, 2 and 3 are shown, with optical paths between the nodes. Other nodes are not shown. Some possible implementations of the nodes are explained below in more detail. Each of the switching nodes may be ROADMs or OXCs for example. The switching nodes can route communications traffic from one optical path to another, or can add or drop traffic from or to an add drop interface, which may be coupled to a local network for example. In the figure, an upper one and a lower one of the switching nodes is shown with an add drop interface, and a middle switching node is shown without such an interface. A routing management system 4 is typically provided, coupled to all the nodes, to control the configuration of switches in the nodes. This may be centralized or at least partly distributed. It can be implemented using conventional communications links of low bandwidth and typically slower than and independent of those used for the communications traffic. The routing management system can be implemented as software running on PCs or other conventional processing equipment.

FIG. 2 shows a schematic view of an ROADM according to conventional practice, for reference, and to show an example of a node to which the embodiments described below can be applied. In FIG. 2, the node has an electrical switch 700 arranged to pass through traffic or to add or drop traffic to an add drop interface in the form of a client interface. The switch is coupled to multiple incoming optical paths 1 ... i. Each path can carry a WDM signal which is fed to an optical preamplifier 418 then a wavelength demultiplexer 419. Separated wavelengths are each fed on separate fibers 417 to input converters in the form of optical to electrical converters 420. The individual electrical signals are all fed to a framer 710 in the form of circuitry for OTN frame processing including FEC processing for example. The signal is then switched by the switch, either to pass through or to be dropped to the client interface.

Another framer 710 is provided at the output of the switch for processing signals corresponding to all the wavelengths to be output onto output optical paths i+1 ... M. Clearly there need not be the same number of outputs as inputs. After the OTN frame processing, the output electrical signals are fed to output converters 425 and then optical signals at individual wavelengths are multiplexed into a WDM optical signal by multiplexer 421. An example of a framer circuit available commercially is a CS6001 chip made by Cortina Systems Inc. The CS6001 Transport Processor supports Core transport processing for various protocols:

Full SONET/SDH TOH processing of OC-768 and OC-192 signals (termination and generation)
Full G.709 compliant O×U2 and O×U3 overhead termination and generation
Asynchronous aggregation of four independent 10G class signals into a standard or an over-clocked OTU3

10GE LAN/WAN, FC-1200, and FC800 non-intrusive Performance Monitoring

Fully transparent and asynchronous mapping of one 40 Gbps or four 10 Gbps tributaries into an OTU3 or four independent OTU2s.

Figure 3:
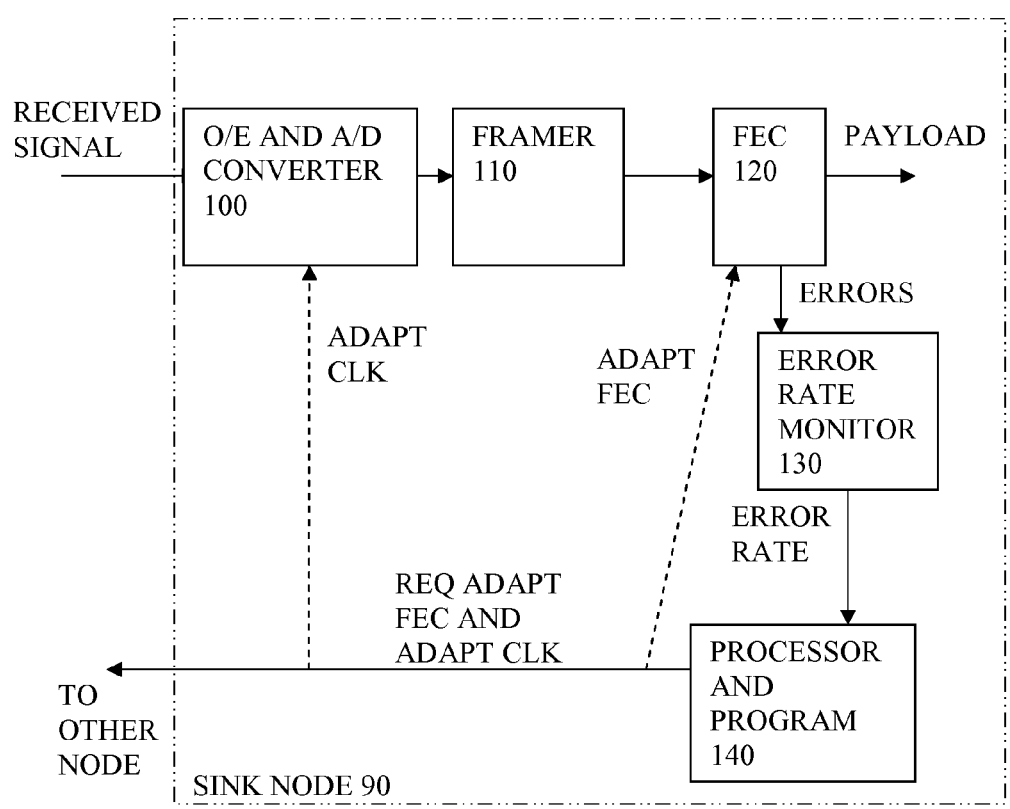
FIG. 3 shows a schematic view of a sink node according to embodiment.

FIG. 3, Sink Node According to Embodiment

FIG. 3 shows a schematic view of a sink node 90 according to an embodiment. An optical signal is received from another node. An optical to electrical converter and analog to digital converter 100 is provided to output a digital signal at a clock rate of the receiver and corresponding to a clock rate of the transmission. The digital signal is fed to the framer 110 which finds the framing information and thus is able to distinguish different parts of each frame, including the FEC information. FEC processing circuitry 120 is also provided. An indication of errors is output and a count of the errors detected by the FEC, or an error rate is monitored by an error rate monitor 130. A processor and a program 140 of instructions to be executed by the processor are used to generate a request to adapt the length of FEC information and the clock rate of the transmission, according to the monitored error rate. This request needs to be sent back to the source node. Once the request is accepted at the source node, the sink node can then adapt to the new length of FEC in the transmission and to the adapted transmission clock rate. This can be done by the processor instructing the converter and other parts of the node to use a lower clock rate for example.

The power saving can in some cases be at the transmission node only, if the sink node continues to use a higher clock rate and does not have a low power mode for the FEC part. Alternatively, various levels of power saving can also be achieved in the sink node. For example the converter and the framer can operate at a lower clock rate. The FEC part can also operate at a lower clock rate, or can be put into a lower power mode such as a standby mode where little or no digital processing is carried out, or a supply voltage is lowered or shut off to some unused parts of the circuitry.

Figure 4:
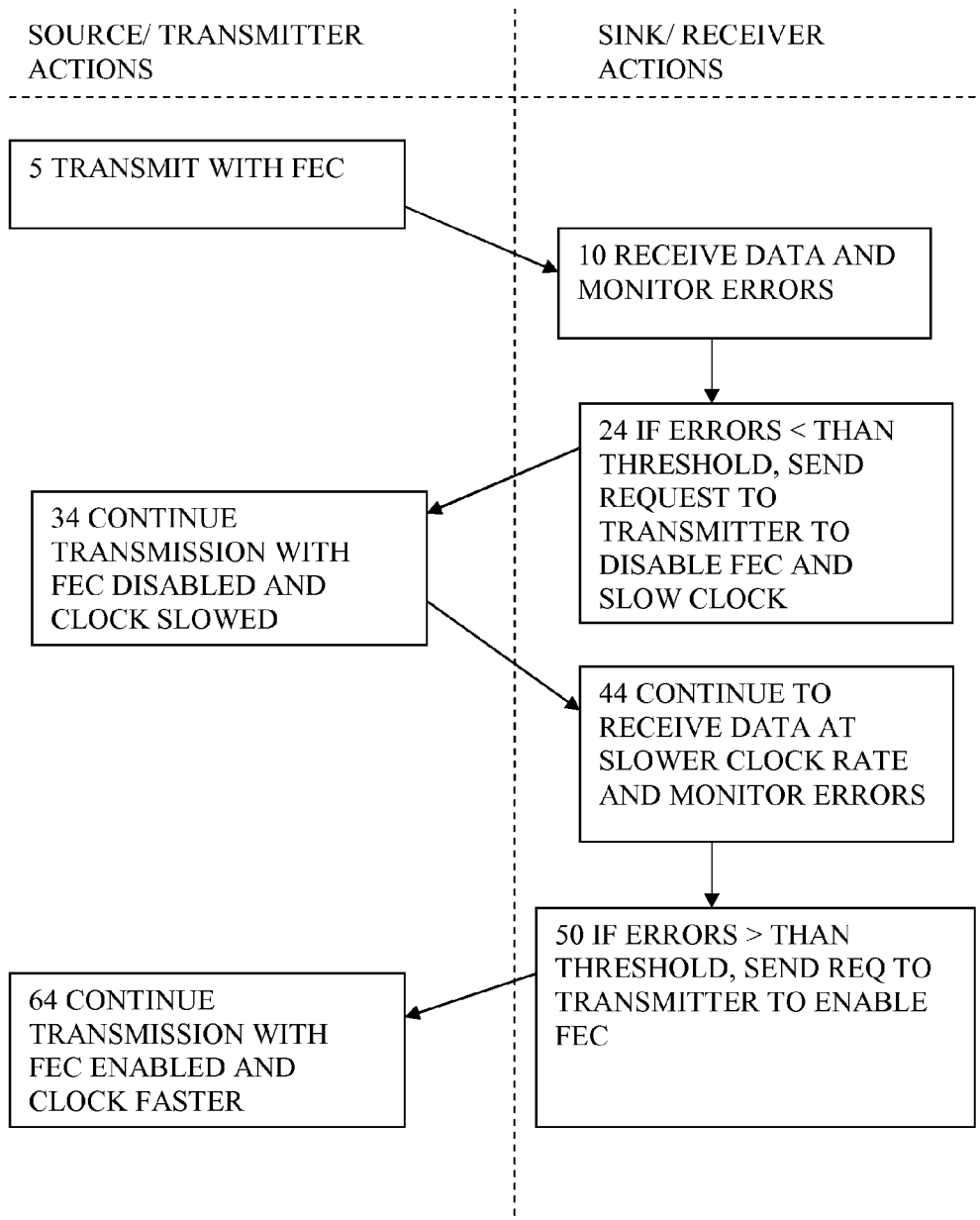
FIG. 4, shows a time chart for a protocol according to embodiment.

FIG. 4, Time Chart for Protocol According to Embodiment

FIG. 4 shows a time chart with time flowing down the drawing. The left column has the actions at the source side, and the right column has the actions at the sink side of the link. At step 5, a frame is transmitted with FEC information. At step 10, the frame is received and errors are detected. For example the errors detected can be errors which are corrected by the FEC part. This is usually better than detecting errors remaining after FEC has been processed, as there may not be any remaining. At step 24 at the sink node, it is determined whether the error rate is less than a threshold. If so, then it is assumed that the length of the FEC information can be adapted by reducing the length or disabling the FEC. A request is sent to the transmitter to request such adaptation of the FEC. At step 34, the transmitter receives the request and continues transmitting frames but with the FEC disabled and the transmission clock rate slowed down. Optionally the error rate can be compared to a number of thresholds to determine if the FEC can be reduced in length rather than completely disabled.

At step 44, the sink node continues to receive the frames at the lower clock rate, and continues to monitor an error rate. This can be done by parity checks or other ways without needing the FEC information, once the FEC is disabled. At step 50, at the sink node, it is determined whether the error rate is greater than a second threshold. If so, it is assumed that more FEC is needed, and the sink node sends a request to the transmitter to enable or increase the length of the FEC information. At step 64, the source node receives the request and continues the transmissions with the FEC enabled and the transmission clock rate speeded up.

Figure 5:
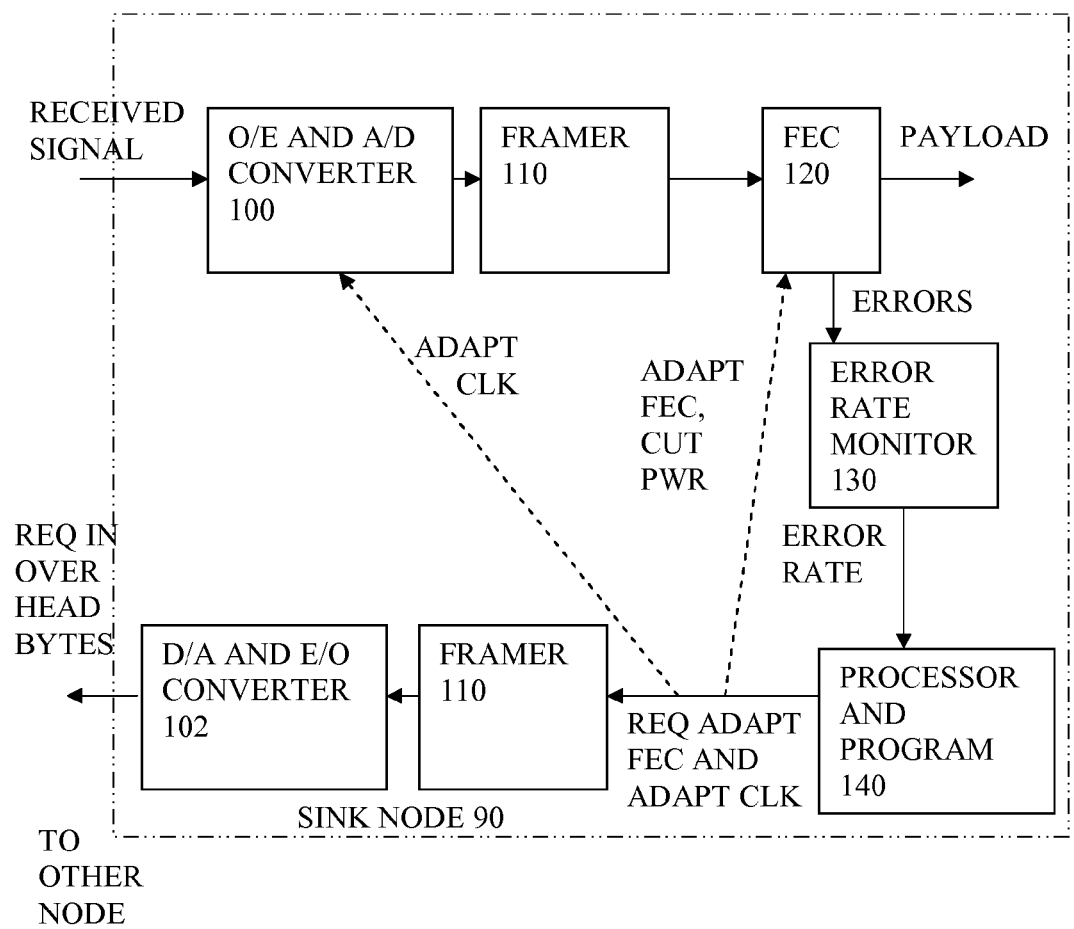
FIG. 5 shows a schematic view of a sink node according to embodiment using OH bytes.

FIG. 5, Sink Node According to Embodiment Using OH Bytes

FIG. 5 shows another embodiment of a sink node 90. This is similar to the embodiment of FIG. 3, and in addition the processor is arranged to send the request to the source node using overhead bytes on a corresponding optical path in the reverse direction to reach the source node. Hence the processor in the sink node is linked to a framer 110 as shown in FIG. 5, to cause the framer to add the request into the overhead bytes. The framer feeds a digital signal to a converter 102 which carries out digital to analog conversion and electrical to optical conversion, to transmit frames which include the request.

FIG. 5 also shows the processor able to control the converter to change a clock rate, and to control the FEC part to reduce an amount of processing or to put the FEC part into a low power mode. Optionally other parts can have their clock rates slowed, including the processor itself, or be put into low power modes, according to the current adaptation of the FEC.

Figure 6:
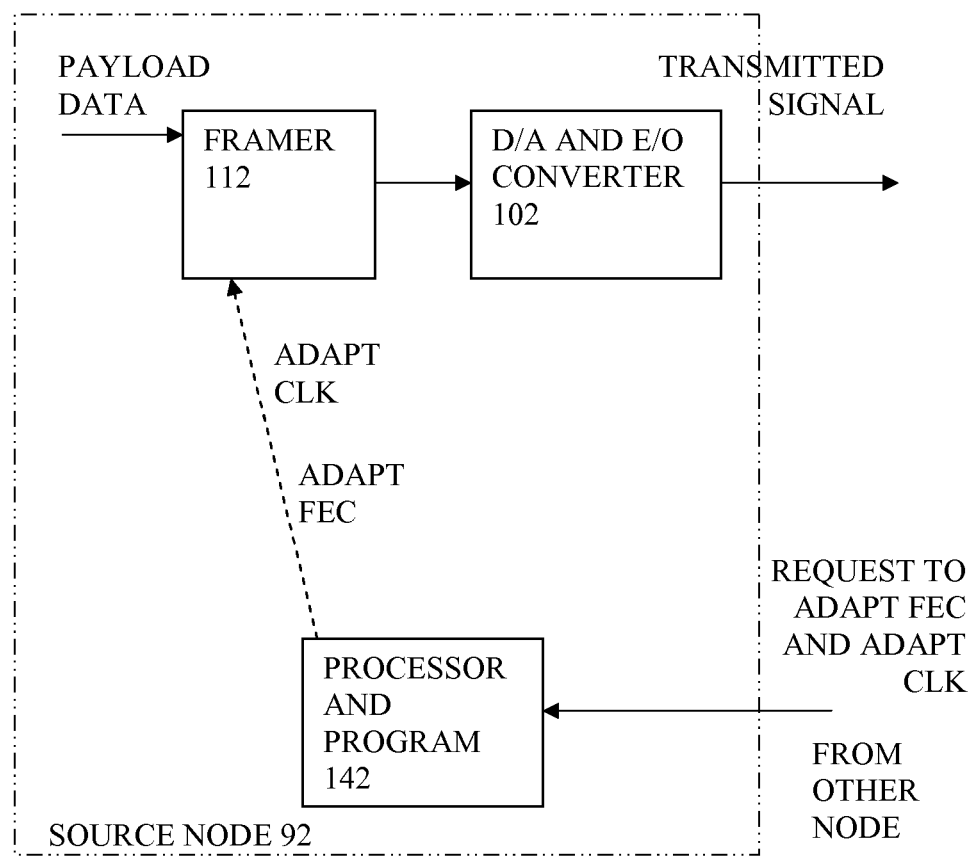
FIG. 6 shows a schematic view of a source node according to embodiment having processor and program for controlling framer.

FIG. 6, Source Node According to Embodiment Having Processor and Program for Controlling Framer FIG. 6 shows a schematic view of an embodiment of a source node 92. Payload data is fed to a framer 112, which calculates the FEC information and outputs a digital signal including the FEC information to a converter 102 which carries out digital to analog conversion and electrical to optical conversion, to transmit frames to the sink node.

A request to adapt the FEC and adapt the clock rate of the transmissions can be received by the source node from the sink node. This is received at a processor arranged to execute a program 142. This processor is linked to the framer to control a transmission clock speed and to command adapting of the FEC operations of the framer. This can mean for example sending a command specifying a length of the FEC information to be calculated by the framer and included in each frame. This may involve for example sending a FEC disable or enable command to the framer.

Figure 7:
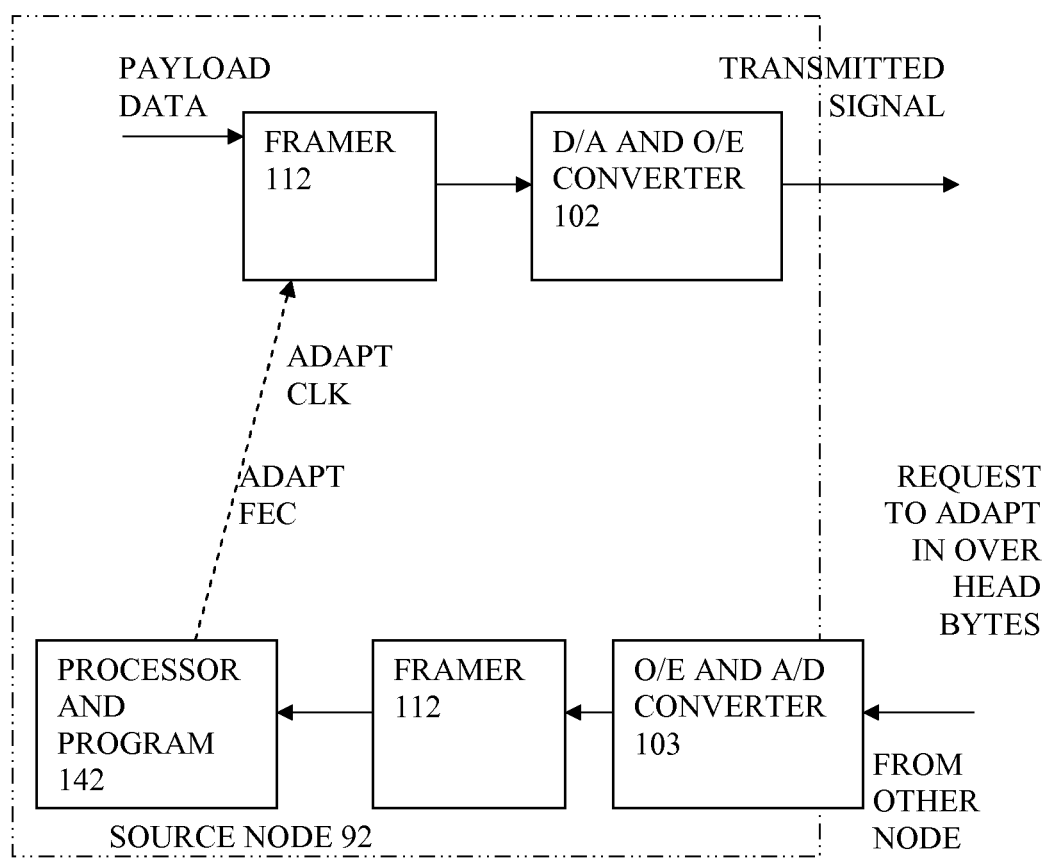
FIG. 7 shows a schematic view of a source node according to embodiment using OH bytes.

FIG. 7, Source Node According to Embodiment Using OH Bytes

FIG. 7 shows a schematic view of another embodiment of a source node 92, similar to that of FIG. 6. In this case, the request is received and detected in the overhead bytes of a corresponding optical channel in the reverse direction from the sink node. The optical signal from the sink node carrying the request is received at a converter 103 which has an optical to electrical converter part and an electrical analog to digital converter, to output a digital signal at a clock rate of the transmission. A framer part 112 can distinguish the frames and read the overhead bytes within the frames. The request can be fed to the processor and program 142, which can then respond by controlling the framer to adapt the FEC and the transmission clock rate.

Figure 8:
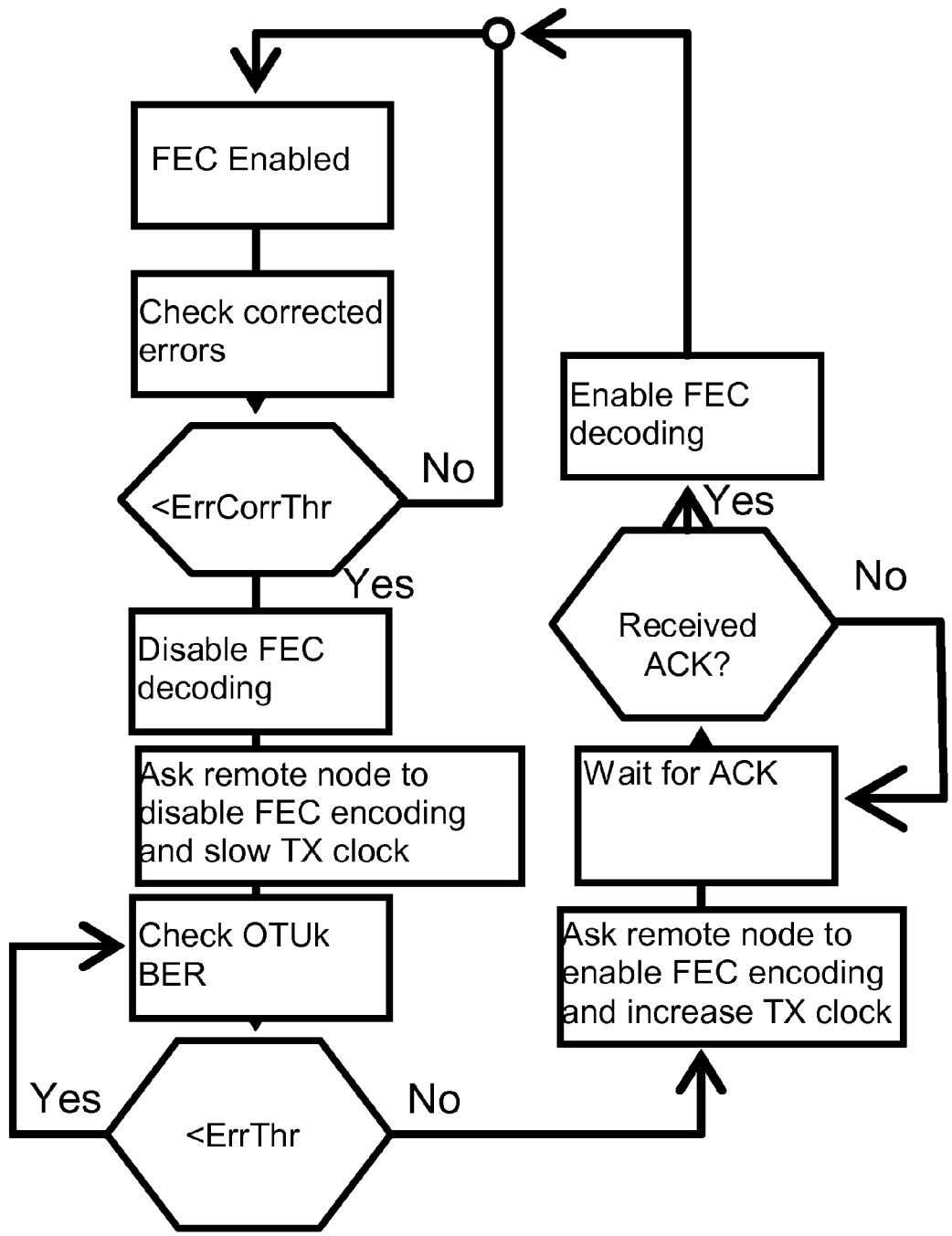
FIG. 8 shows a flow chart of another embodiment.

FIG. 8, Flow Chart of Another Embodiment

FIG. 8 shows a flow chart according to another embodiment based on G.709 frames and using overhead bytes to send the request. When the OTUk link is set up both the FEC encoding and decoding are enabled (Starting Point at the top of the drawing). Based on the information of the errors corrected by the FEC the OCh/OTUk-a_A_Sk function decides if the FEC is necessary for that link or not:

If the number of corrected errors for a time interval $\Delta T$ is below a threshold (<ErrCorrThr), then the quality of the link is good enough and the FEC on that link can be disabled. Therefore the OCh/OTUk-a A Sk function at the sink will disable the FEC decoding and will ask the OCh/OTUk-a_A_So function at the source to disable the FEC encoding and to slow the tx clock;

If the number of corrected errors for a time ΔT is above a threshold (≥ErrCorrThr), then the quality of the link is poor and requires the FEC on that link. No action is taken in this case. When the FEC is disabled the OCh/OTUk-a_A_Sk function monitors the BER of the OTUk section, via the OTUk SM OH and decides if the FEC is necessary for that link or not:

If the number of BIP-8 errors for a time interval ΔT is below a threshold (<ErrThr), then the quality of the link is good enough and the FEC on that link can continue to be disabled. No action is taken in this case;

If the number of BIP-8 errors for a ΔT is above a threshold (≥ErrThr), then the quality of the link is poor and requires the FEC on that link. Therefore the OCh/OTUk-a_A_Sk function at the sink node will ask the OCh/OTUk-a_A_So function at the source node to enable the FEC encoding and to increase the tx clock. Then, at the sink node, after the reception of an acknowledge from the source node, the sink node will enable the FEC decoding as well.

Although the example is for adapting by enabling or disabling the FEC, it can also be arranged to adapt by increasing or decreasing the length of the FEC information. Having a longer FEC part can enable more errors to be corrected.

Figure 9:
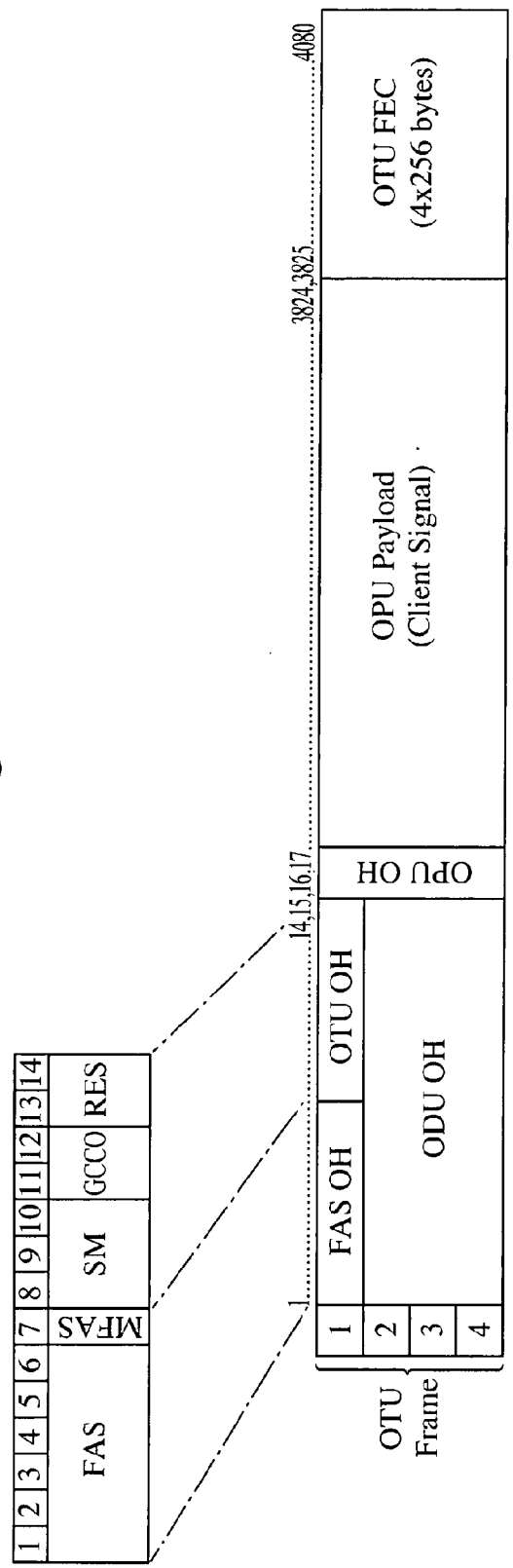
FIG. 9 shows a conventional frame to show FEC and OH bytes for use by embodiments.

FIG. 9 Frame for G.709 Example

The above protocol messages can optionally be transported via one of the G.709 OTUk OH (overhead) bytes. As shown in FIG. 9, a frame has four rows, and the OTU overhead is comprised of SM, GCC0 and RES bytes, after the frame alignment bytes FASOH, and starting at row 1 column 8. The section monitoring (SM) bytes are used for the trail trace identifier (TTI), parity (BIP-8) and the backward error indicator (BEI), or backward incoming alignment error (BIAE), backward defect indicator (BDI), and incoming alignment error (IAE).

General communication channel 0 (GCC0) is a clear channel used for transmission of information between OUT termination points. The reserved (RES) bytes are currently undefined in the standard. Hence these bytes, located at row 1, column 13 or 14 of the OTUk frame could be used for sending the above mentioned messages for requesting FEC adaptation and clock rate changes.

Notably the above protocol could be even enhanced to move not only from disabled FEC to enabled FEC and vice versa, but also for example to move from enabled 20% FEC to 7% FEC and vice versa depending on the quantity of errors present on the link. FIG. 9 also shows the FEC bytes at the end of each row of the frame in the ITU G.709 standard. FEC is the last part added to the frame before the frame is scrambled. The frame has four rows. Each row is broken down into 16 sub-rows comprised of 255 bytes each. A sub-row is composed of interleaved bytes so that the first sub-row contains the first overhead (OH) byte, the first payload byte and the first FEC byte, and so on for the remaining sub-rows of each row in the frame. The first FEC byte starts at position 240 for all sub-rows. The FEC uses a Reed-Solomon RS (255/239) coding technique. This means that 239 bytes are required to compute a 16-byte parity check. The FEC can correct up to eight (bytes) errors per sub-row (codeword) or detect up to 16 byte errors without correcting any. Combined with the byte interleave capability included in ITU G.709 implementation, the FEC is more resilient to error burst, where up to 128 consecutive bytes can be corrected per OTU frame row. Of course other ways of sending the requests for FEC adaptation and thus clock rate changes, can also be envisaged, such as from source to sink via the routing management system shown in FIG. 1, or some other separate management information path.

Figure 10:
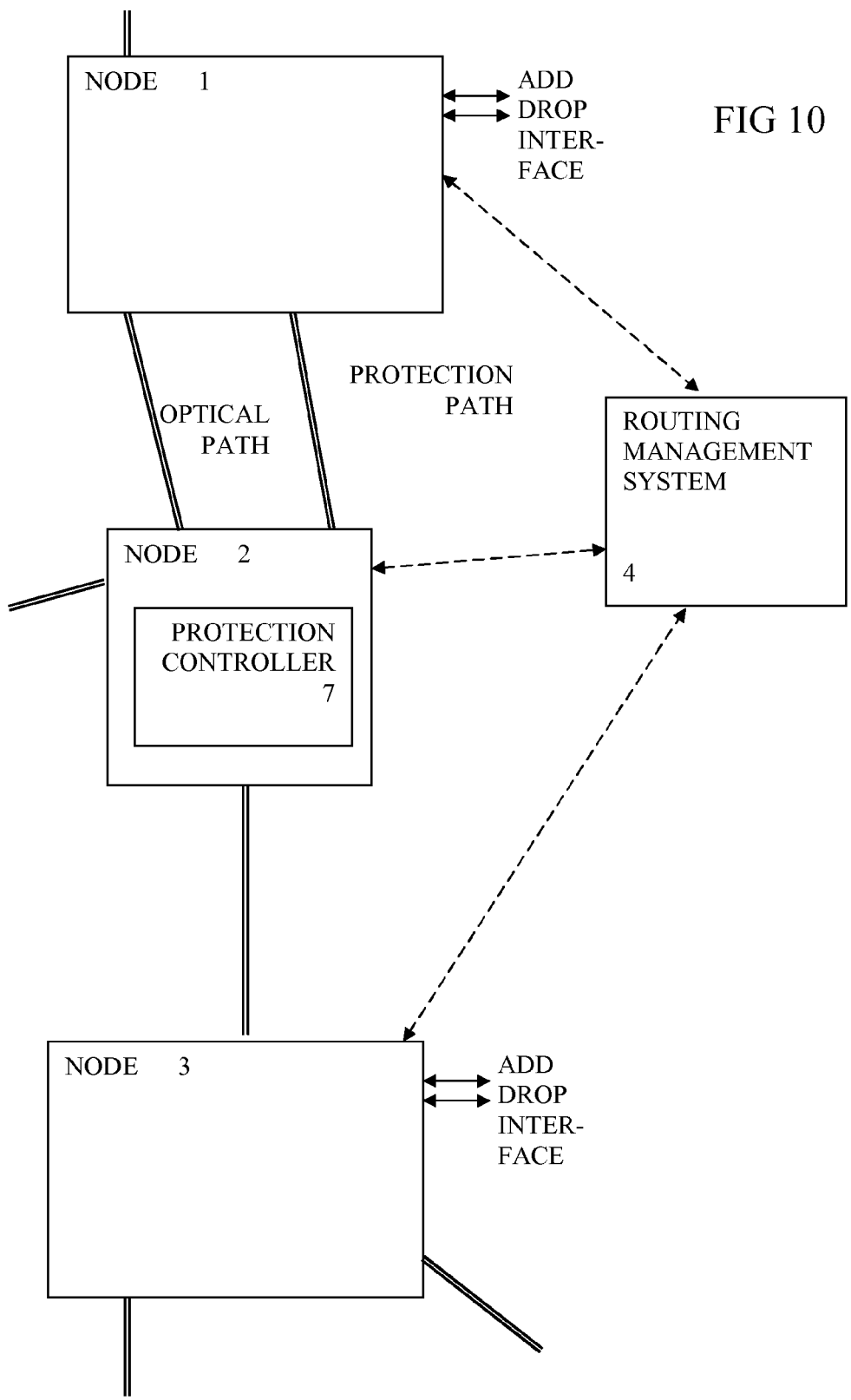

FIGS. 10, 11, Protection Switching During Clock Adaptation

FIGS. 10 and 11 show an embodiment which uses protection switching to reduce errors which might be caused during a transition of the transmission clock. FIG. 10 shows a network view similar to that of claim 1, with a protection path between nodes 1 and 2, and a protection controller part 7 at node 2. FIG. 11 shows a time chart similar to that of FIG. 4, but with alterations to provide for use of a protection path during clock rate changes. Node 1 can be regarded as a source node and node 2 as a sink node. Compared to FIG. 4, instead of step 24, there is a step 26 at which the sink node determines if the error rate is less than a threshold, then the protection controller 7 is made to switch to using the protection path instead of the working path. Then a request is made as in step 24, to request the source node to disable the FEC and reduce the transmission clock rate. Step 34 is as in FIG. 4.

At step 46, once the clock rate on the main path has changed to the slower rate, the sink node requests the protection path controller to switch back to the main path, instead of using the protection path. At step 47, the sink node requests that the protection path also use the slower clock rate. This can involve a similar exchange of messages as set out above. Steps 50 and 64 can be the same as in FIG. 4, or can be altered to request the protection path be used while the transmission clock rate changes.

SUMMARY OF ADDITIONAL FEATURES

The embodiments as described can enable the operator have the FEC enabled on a link only when necessary, to tune the transmission clock accordingly and therefore avoid power consumption for the unnecessary FEC processing, and the unnecessarily high transmission clock rate.

The converter can also be arranged to adapt its clock rate to match the adapted clock rate of the transmission. This can enable further power saving, though in principle the receiver could oversample the transmitted data.

The sink node can have a transmitter for transmitting frames to the other node, the frames having an overhead part, and the framer being arranged to incorporate the request into the overhead part of a frame. This is likely to be the fastest way of passing messages so that disruptions during adaptations can be minimised. The network can have a protection controller for controlling a protection path for the transmissions to the node, the processor being arranged to request the protection controller to use the protection path during the adapting of the clock rate. This can help minimise disruption to payload data transmission, possibly making it hitless, but can be more complex and time consuming.

The processor can be arranged to detect an acknowledgement from the other node of the request, before enabling the converter to adapt its clock rate. This can help minimise disruption during adaptations.

The error corrector can have a low power mode, for use when the error correction part is no longer being sent by the other node, which can help further reduce power consumption.

The monitor can be arranged to monitor at least errors detected by the error corrector when the error correction part is being sent, and to monitor at least a frame parity check by the framer, when the error correction part is not being sent. This makes use of existing mechanisms to minimise additions, and maintain more compatibility with existing standards.

The source node can have a receiver for receiving frames from the other node, the frames having an overhead part, and the framer being arranged to read the request from the overhead part of a frame. This enables rapid passing of messages so that disruptions during adaptations are minimised.

The source or sink node can be arranged so that the adaptation of the clock rate corresponds to an increase or decrease in a length of the frame caused by the adaptation of the length of the error correction part. This helps make the most use of dead time, without altering overall frame time, and can help maintain compatibility with standards. The frames can be compatible with the definition of OTUk frames described in standard G.709. This is a widely used standard though in principle the techniques can be applicable to other types of frames.

Additional method steps can involve sending the request from the sink node by encoding the request in an overhead part of a frame and sending that frame from the sink node to the source node.

Another additional feature is the receiving step comprising digitizing at a receiver clock rate a received optical signal, and adapting the receiver clock rate to match the adapted clock rate of the transmission.

Another such additional step is sending an acknowledgement from the source node to the sink node after the source node has received the request.

The sink node can have circuitry for the error correcting, and the method can have the step of putting the circuitry into a low power mode when the error correction part is no longer being sent by the source node.

Other variations and embodiments can be envisaged within the claims.

The invention claimed is:

1. A node for a communications network, the node having:
   a converter for digitizing at a receiver clock rate a received optical signal received over an optical link from an optical transmitter at another node to yield digital data;
   a framer for detecting frames in the digital data, the frames each having a payload part and a forward error correction part;
   an error corrector for correcting errors in the payload part of those the frames including errors using the forward error correction part of those frames;
   a monitor for monitoring an error rate in the received payload parts; and
   a processor arranged to, when the monitored error rate is determined to be less than a threshold, reduce a power consumption of at least the another node by causing a request to be sent to the optical transmitter to reduce a length of the transmitted forward error correction part in subsequent frames and also to decrease a clock rate of the transmission of the subsequent frames by an amount selected based upon the reduced length of the forward error correction part to maintain a same payload transmission rate.

2. The node of claim 1, the converter also being arranged to decrease its clock rate to match the decreased clock rate of the transmission.

3. The node of claim 1, having a transmitter for transmitting frames to the another node, the frames each having an overhead part, and the framer being arranged to incorporate the request into the overhead part of a transmitted frame.

4. The node of claim 1, the communications network having a protection controller for controlling a protection path for the transmissions to the node, the processor being arranged to request the protection controller to use the protection path during the decreasing of the clock rate.

5. The node of claim 1, the processor being arranged to detect an acknowledgement from the another node of the request, before enabling the converter to decrease the clock rate.

6. The node of claim 1, wherein the framer is further arranged to detect other frames in the digital data that do not include the forward error correction part, and wherein the error corrector is adapted to have a low power mode for use when the forward error correction part is no longer being sent by the another node.

7. The node of claim 1, wherein the framer is further arranged to detect other frames in the digital data that do not include the forward error correction part, and wherein the monitor is further adapted to monitor at least errors detected by the error corrector when the forward error correction part is being sent, and to further monitor at least a frame parity check when the forward error correction part is not being sent.

8. A node for a communications network, the node having:
   an optical transmitter for transmitting an optical signal over an optical link to another node;
   a framer for outputting frames, wherein each of the frames has a payload part and a forward error correction part, at a clock rate;
   a converter for converting the frames into the optical signal for transmission; and
   a processor arranged to reduce a power consumption of the node while maintaining a same payload transmission rate by, in response to receipt of a request to reduce a length of the transmitted forward error correction part in subsequent outputted frames and also to decrease the clock rate of the framer, cause the subsequent frames to be transmitted with a decreased forward error correction part and also cause the framer to output the subsequent frames at a decreased rate selected based upon a size of the decreased forward error correction part to maintain the same payload transmission rate.

9. The node of claim 8, the node having a receiver for receiving frames from the another node, the frames each having an overhead part, and the framer being arranged to read the request to reduce the length of the forward error correction part from the overhead part of a frame.

10. The node of claim 8, the frames being compatible with the definition of Optical Transport Unit (OTUk) frames described in standard G.709.

11. A method of transmitting a payload of data from a first node of a communications network acting as a source node to a second node acting as a sink node, the method having the steps of:
   transmitting frames of data from the source node, wherein each of the frames includes a payload part and a forward error correction part;
   receiving at the source node a request from the sink node to reduce a length of the transmitted forward error correction part in subsequent frames and also to decrease a clock rate of the transmission of the subsequent frames while maintaining a same payload transmission rate to reduce a power consumption of the source node; and
   transmitting, by the source node at a reduced power consumption but with a same payload transmission rate, the subsequent frames with a reduced length of the forward error correction part at a decreased clock rate selected based upon the reduced length of the forward error correction part to maintain the same payload transmission rate.

12. A method of receiving a payload of data sent from a first node of a communications network acting as a source node to a second node acting as a sink node, the method having the steps of:
- at the sink node, receiving frames of data from the source node, the frames each having a payload part and a forward error correction part;
- correcting errors in the payload part of at least one of the frames using the forward error correction part of the at least one of the frames;
- monitoring an error rate in the received payload part of the frames;
- sending a request to the source node to reduce a length of the transmitted forward error correction part in subsequent frames and also to decrease a clock rate of the transmission of the subsequent frames; and
- receiving, at the sink node, the subsequent frames transmitted with the reduced length of the transmitted forward error correction part at the decreased clock rate selected based upon the reduced length of the forward error correction part to maintain the same payload transmission rate and reduce the power consumption of the source node the forward error correction part.

13. A method of transmitting a payload of data from a first node of a communications network acting as a source node to a second node acting as a sink node, the method having the steps of:
- transmitting frames of data from the source node, wherein each of the frames includes a payload part and a forward error correction part;
- receiving, at the sink node, the frames of data:
- correcting, at the sink node, one or more errors in the payload part of at least one of the frames using the forward error correction part of the at least one of the frames;
- monitoring, at the sink node, an error rate in the received payload parts of the frames;
- sending, at the sink node when the monitored error rate is determined to be less than a threshold, a request to the source node to reduce a length of the transmitted forward error correction part in subsequent frames and also to decrease a clock rate of the transmission of the subsequent frames while maintaining a same payload transmission rate to reduce the power consumption of the source node;
- transmitting, at the source node, the subsequent frames with a decreased length of the forward error correction part at a decreased rate selected based upon a size of the decreased length of the forward error correction part to maintain the same payload transmission rate and also reduce a power consumption of the source node; and
- receiving, at the sink node, the subsequent frames transmitted at the decreased rate and including the decreased length of the forward error correction part.

14. The method of claim 13, wherein the request from the sink node is encoded in an overhead part of a request frame sent from the sink node to the source node.

15. The method of claim 13, wherein said receiving comprises digitizing at a receiver clock rate a received optical signal, wherein the receiver clock rate is adapted to match the adapted clock rate of the transmission.

16. The method of claim 13, further comprising sending an acknowledgement from the source node to the sink node after the source node has received the request.

17. The method of claim 13, wherein the sink node includes circuitry for performing the error correcting, and wherein the method further comprises putting the circuitry into a low power mode when the forward error correction part is no longer being sent by the source node.

18. A non-transitory computer readable storage medium having a stored program for execution by a processor for controlling a node for a communications network, the node having a converter for digitizing at a receiver clock rate a received optical signal received over an optical link from an optical transmitter at another node to yield digital data, a framer for detecting frames in the digital data, the frames each having a payload part and a forward error correction part, the node also having an error corrector for correcting errors in the payload part of those of the frames having errors using the forward error correction part of the frame, and a monitor for monitoring an error rate in the received payload parts of the frames, the program having instructions which when executed by the processor cause the processor to carry out the steps of:
- receiving a monitored error rate from the monitor; and
- causing the another node to reduce a power consumption of the another node by sending, upon a determination that the monitored error rate is less than a threshold, a request to the optical transmitter to reduce a length of the transmitted forward error correction part in subsequent frames and also to decrease a clock rate of the transmission of the subsequent frames based upon the reduced length of the transmitted forward error correction part to both maintain a same payload transmission rate and reduce the power consumption of the another node.

19. A non-transitory computer readable storage medium having a stored program for execution by a processor for controlling a node for a communications network, the node having an optical transmitter for transmitting an optical signal over an optical link to another node, a framer for outputting frames having a payload part and a forward error correction part, a converter for converting the frames into the optical signal for transmission, and a node processor arranged to receive a request to reduce a length of the forward error correction part in subsequent frames and to reduce a clock rate of the framer for the subsequent frames, the program having instructions which when executed by the processor cause the processor to carry out the steps of:
- causing the optical transmitter to transmit a first set of one or more frames of data, wherein each of the first set of frames includes a payload part and a forward error correction part;
- receiving a request from the another node to reduce the length of the transmitted forward error correction part when transmitting a second set of one or more frames and also to decrease the clock rate of the transmission of the second set of frames based upon the reduced length of the forward error correction part to maintain a same payload transmission rate and reduce the power consumption of the node;
- causing the optical transmitter to adapt the clock rate of the transmission for the second set of frames according to the reduced length the forward error correction part; and
- at the node, transmitting the second set of frames with the reduced length of the forward error correction part.

* * * * *

UNITED STATES PATENT AND TRADEMARK OFFICE
CERTIFICATE OF CORRECTION

| | | |
|---|---|---|
| PATENT NO. | : 9,264,168 B2 | Page 1 of 1 |
| APPLICATION NO. | : 13/996444 | |
| DATED | : February 16, 2016 | |
| INVENTOR(S) | : Lanzone et al. | |

It is certified that error appears in the above-identified patent and that said Letters Patent is hereby corrected as shown below:

In the specification

In Column 3, Line 48, delete "length the" and insert -- length of the --, therefor.

In Column 4, Line 5, delete "FIG. 4," and insert -- FIG. 4 --, therefor.

In Column 4, Line 19, delete "adaptation" and insert -- adaptation. --, therefor.

In Column 5, Line 27, delete "trough" and insert -- through --, therefor.

In the claims

In Column 14, Line 60, in Claim 19, delete "length the" and insert -- length of the --, therefor.

Signed and Sealed this
Tenth Day of May, 2016

Michelle K. Lee
*Director of the United States Patent and Trademark Office*